(12) United States Patent
Gautschi et al.

(10) Patent No.: US 9,328,617 B2
(45) Date of Patent: May 3, 2016

(54) TRAILING EDGE OR TIP FLAG ANTIFLOW SEPARATION

(75) Inventors: Steven Bruce Gautschi, Naugatuck, CT (US); Brandon W. Spangler, Vernon, CT (US); San Quach, East Hartford, CT (US); Dominic J. Mongillo, Jr., West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 1049 days.

(21) Appl. No.: 13/424,765

(22) Filed: Mar. 20, 2012

(65) Prior Publication Data

US 2013/0251539 A1    Sep. 26, 2013

(51) Int. Cl.
    *F01D 5/18* (2006.01)

(52) U.S. Cl.
    CPC .......... *F01D 5/187* (2013.01); *F05D 2240/304* (2013.01); *F05D 2250/314* (2013.01); *F05D 2260/22141* (2013.01); *Y02T 50/676* (2013.01)

(58) Field of Classification Search
    CPC . F01D 5/187; Y02T 50/676; F05D 2250/314; F05D 2260/22141; F05D 2240/304
    USPC ........................ 415/115; 416/97 R, 95, 241 R
    See application file for complete search history.

(56) References Cited

U.S. PATENT DOCUMENTS

| | | | |
|---|---|---|---|
| 5,246,341 A * | 9/1993 | Hall et al. | 416/97 R |
| 5,337,805 A * | 8/1994 | Green et al. | 164/369 |
| 5,368,441 A * | 11/1994 | Sylvestro et al. | 416/97 R |
| 5,403,156 A * | 4/1995 | Arness et al. | 416/96 R |
| 5,599,166 A * | 2/1997 | Deptowicz et al. | 416/97 R |
| 5,669,759 A | 9/1997 | Beabout | |
| 5,851,105 A | 12/1998 | Fric et al. | |
| 6,179,556 B1 | 1/2001 | Bunker | |
| 6,179,565 B1 * | 1/2001 | Palumbo et al. | 416/97 R |
| 6,468,031 B1 * | 10/2002 | Yu et al. | 415/115 |
| 6,672,829 B1 | 1/2004 | Cherry et al. | |
| 7,008,186 B2 | 3/2006 | Heeg et al. | |
| 7,021,893 B2 | 4/2006 | Mongillo, Jr. et al. | |
| 7,241,108 B2 | 7/2007 | Lewis | |
| 7,377,748 B2 | 5/2008 | Mongillo, Jr. et al. | |
| 7,473,073 B1 | 1/2009 | Liang | |
| 7,625,178 B2 | 12/2009 | Morris et al. | |
| 7,980,818 B2 | 7/2011 | Kizuka et al. | |
| 8,052,378 B2 | 11/2011 | Draper | |
| 8,070,441 B1 | 12/2011 | Liang | |

(Continued)

OTHER PUBLICATIONS

The PCT International Search Report mailed Mar. 26, 2013 for the PCT International Application No. PCT/US13/20973.

*Primary Examiner* — Christopher Verdier
*Assistant Examiner* — Aaron R Eastman
(74) *Attorney, Agent, or Firm* — Kinney & Lange, P.A.

(57) ABSTRACT

An airfoil includes a leading edge, a trailing edge region, a suction surface, a pressure surface, a cooling passageway, and a column of flow separators. The suction surface and the pressure surface both extend axially between the leading edge and the trailing edge region, as well as radially from a root section of the airfoil to a tip section of the airfoil to define a central cavity of the airfoil. The cooling passageway is located within the central cavity at the trailing edge region. The column of flow separators is located in the cooling passageway adjacent the trailing edge and includes a first flow separator having a first longitudinal axis and a second flow separator having a second longitudinal axis. The first longitudinal axis is offset at an angle with respect to the first longitudinal axis.

10 Claims, 5 Drawing Sheets

(56) References Cited

U.S. PATENT DOCUMENTS

| | | |
|---|---|---|
| 2005/0106007 A1* | 5/2005 | Mongillo et al. ............ 415/115 |
| 2005/0135933 A1* | 6/2005 | Gregg et al. ................. 416/108 |
| 2005/0191167 A1* | 9/2005 | Mongillo et al. ............ 415/115 |
| 2005/0276698 A1* | 12/2005 | Kvasnak et al. ............. 416/115 |
| 2008/0181774 A1* | 7/2008 | Cunha ............................ 416/92 |
| 2010/0329835 A1 | 12/2010 | Spangler et al. |

* cited by examiner

TRAILING EDGE OR TIP FLAG ANTIFLOW SEPARATION

STATEMENT OF GOVERNMENT INTEREST

The U.S. Government has a paid-up license in this invention and the right in limited circumstances to require the patent owner to license others on reasonable terms as provided for by the terms of N00019-02-C-3003 awarded by The United States Air Force.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

An airfoil includes a leading edge, a trailing edge region, a suction surface, a pressure surface, a cooling passageway, and a column of flow separators. The trailing edge region is located axially downstream from the leading edge and terminates in a trailing edge. The suction surface and the pressure surface both extend axially between the leading edge and the trailing edge region, as well as radially from a root section of the airfoil to a tip section of the airfoil to define a central cavity of the airfoil. The cooling passageway is located within the central cavity at the trailing edge region. The column of flow separators are located in the cooling passageway adjacent the trailing edge. The column of flow separators includes a first flow separator having a first longitudinal axis and a second flow separator having a second longitudinal axis. The first longitudinal axis is offset at an angle with respect to the first longitudinal axis.

An airfoil for a gas turbine engine includes an airfoil, an internal chamber, and a column of teardrop features. The airfoil includes a convex surface and a concave surface. Both the convex surface and the concave surface extend radially from a root section to a tip section and axially from a leading edge to a trailing edge section. The trailing edge section terminates in a trailing edge having a cut-back on the concave surface. The internal chamber is defined between the convex surface and the concave surface and includes an axially extending cooling air passageway. The cooling air passageway has a plurality of radially spaced cooling air slots terminating in outlets at the trailing edge. The column of teardrop features is located in the cooling air passageway and includes a first teardrop, a second teardrop, and a third teardrop. The first teardrop is spaced from the tip section by a first cooling air slot. The second teardrop is spaced from the first teardrop by a second cooling air slot. The third teardrop spaced from the second teardrop by a third cooling air slot. The third teardrop and the second teardrop extend parallel to one another, and the first teardrop is oriented at an angle relative to the second teardrop.

An airfoil for a gas turbine engine including a leading edge, a trailing edge, a pressure surface, a suction surface, a cooling passageway, a first flow separator, and a second flow separator. The leading edge and the trailing edge both extend from a root section to a tip section. The pressure surface and the suction surface both extend between the leading edge and the trailing edge, as well as between the root section and the tip section. The pressure surface and the suction surface define a hollow center. The cooling passageway extends through the hollow center and includes cooling slots terminating with outlets at the trailing edge. The first flow separator is located within the cooling passageway adjacent the trailing edge and spaced from the tip section by a first cooling slot. The first flow separator includes a first rounded upstream end, a first outer wall, and a first inner wall. The first outer wall and first inner wall converge at a first downstream end, and a first longitudinal axis extends through the first flow separator from the first rounded upstream end to the first downstream end. The second flow separator is spaced from the first flow separator by a second cooling slot. The second flow separator includes a second rounded upstream end, a second outer wall, and a second inner wall. The second outer wall and second inner wall converge at a second downstream end, and a second longitudinal axis extends through the second flow separator from the second rounded upstream end to the second downstream end. The first longitudinal axis is angled with respect to the second longitudinal axis.

DETAILED DESCRIPTION

Figure 1:
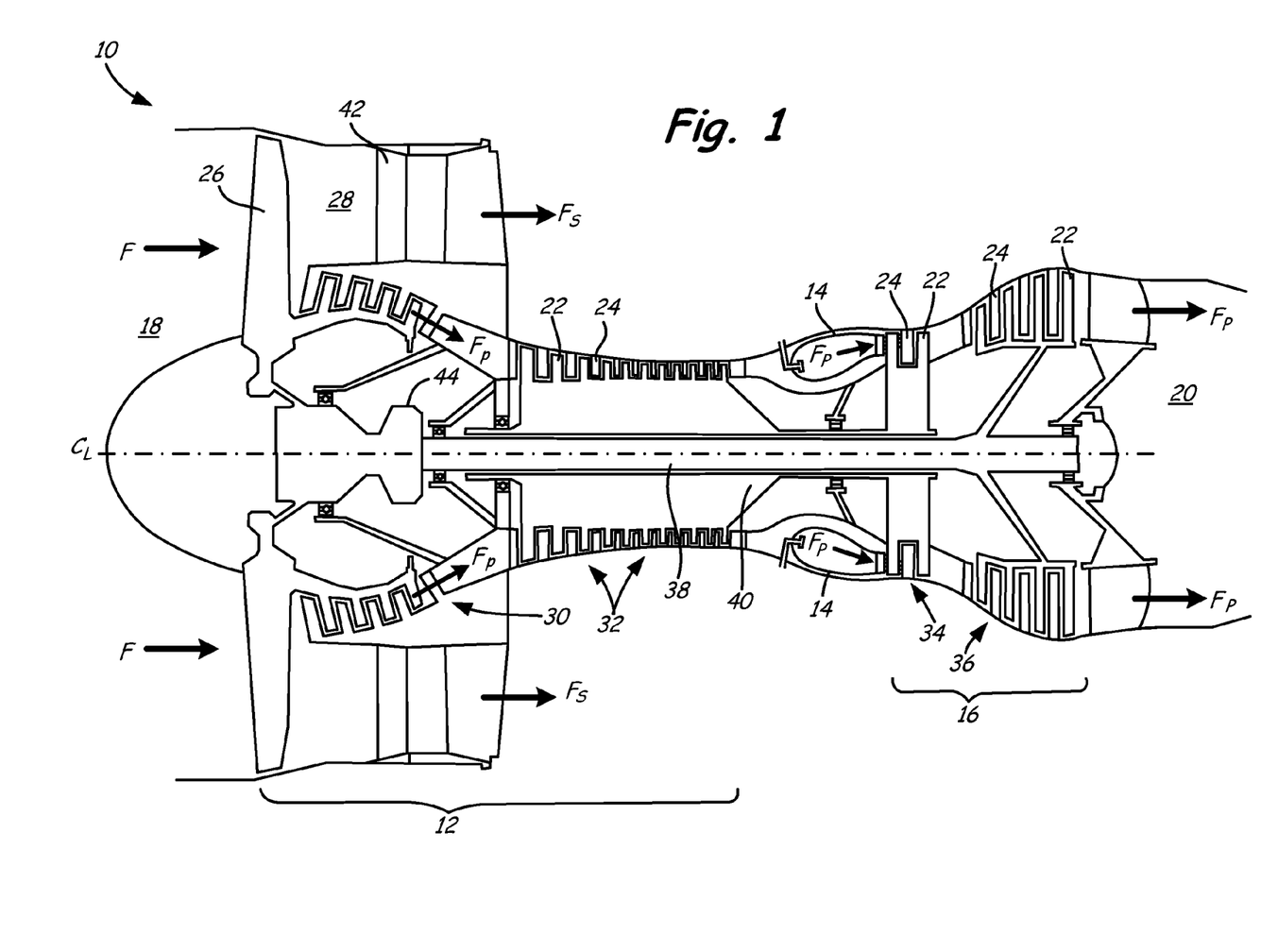
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but not limited to, cooled gas turbine engine components in compressor sections 30 and 32, combustor 14, turbine sections 34 and 36, and exhaust section 20 of gas turbine engine 10.

Figure 2A:
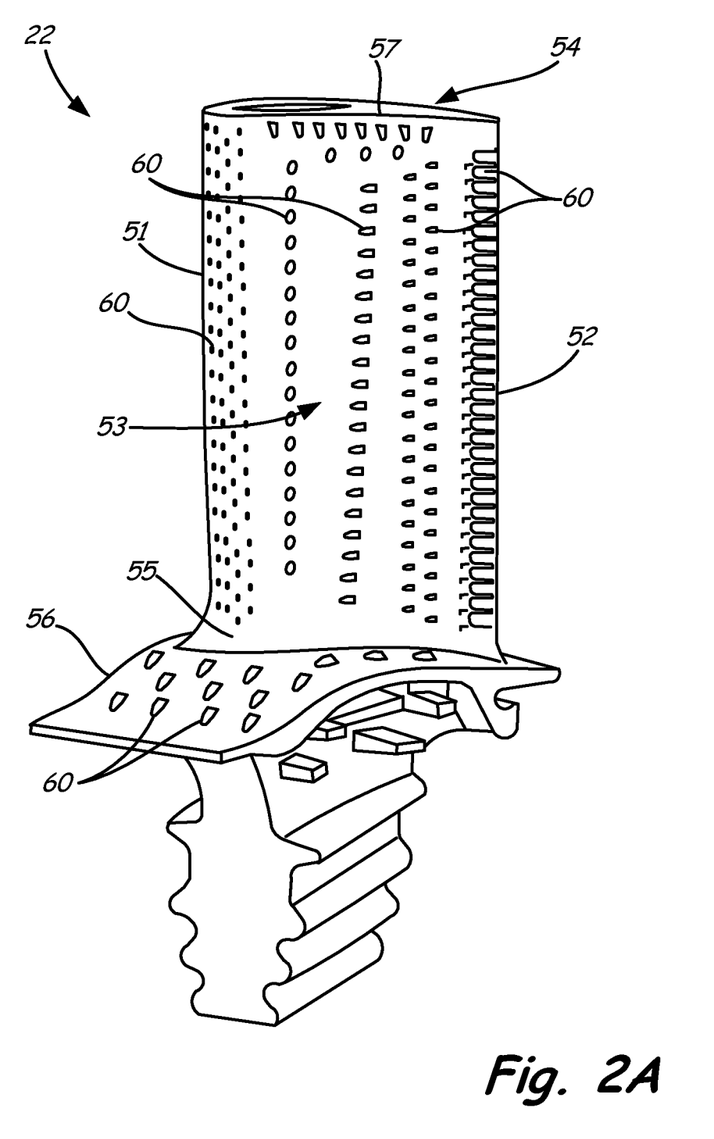
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
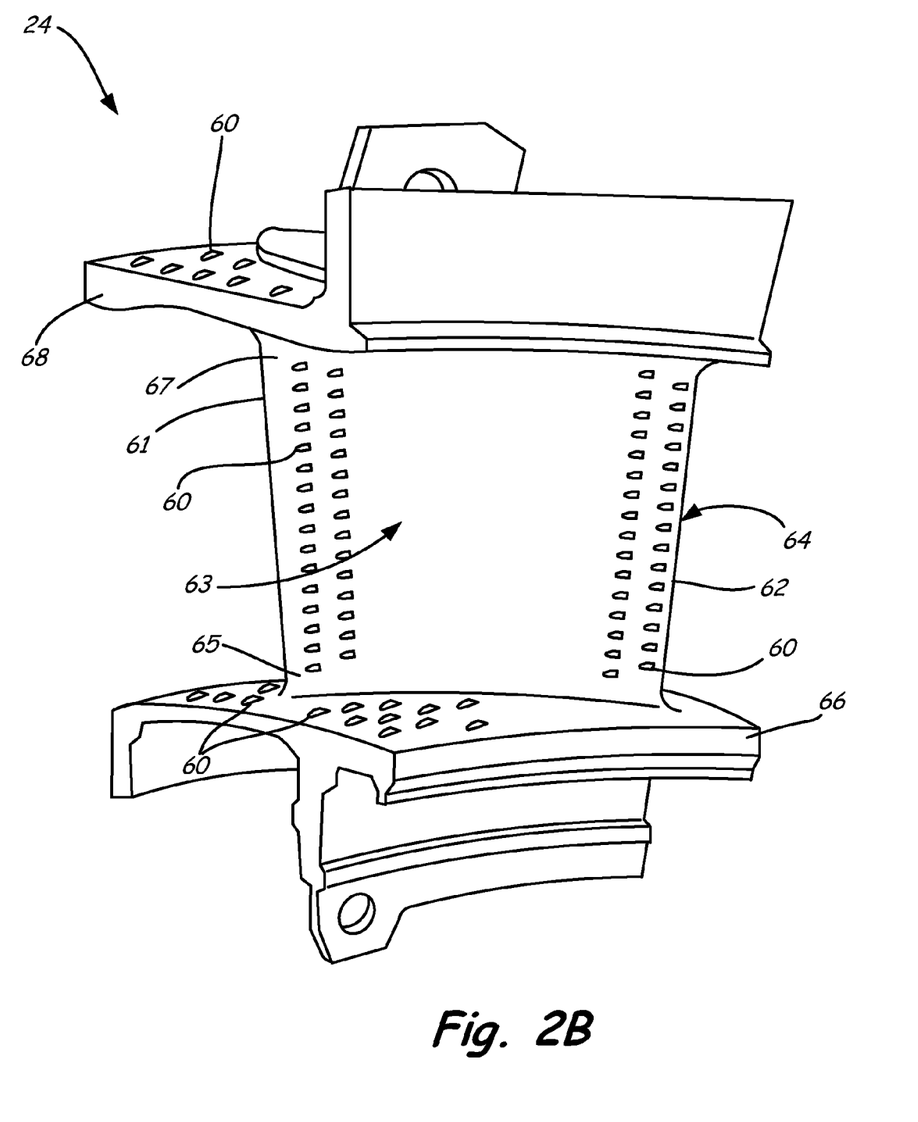
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

Figure 3:
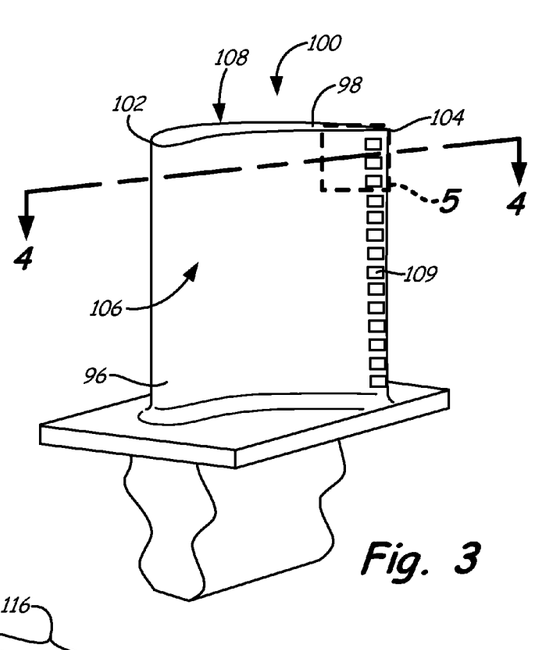
FIG. 3 is a perspective view of a rotor blade.
Figure 4:
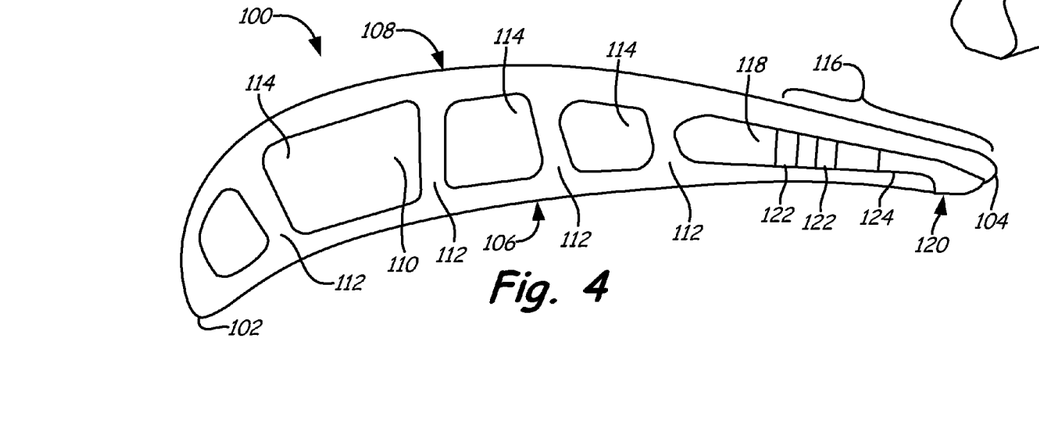
FIG. 4 is an axial cross-sectional view of the rotor blade from FIG. 3.

FIG. 3 is a perspective view of rotor blade 100, and FIG. 4 is a cross-sectional view of rotor blade 100 taken on line 4-4 in FIG. 3. Rotor blade 100 includes root section 96, tip section 98, leading edge 102, trailing edge 104, pressure or concave surface (front) 106, suction or convex surface (back) 108, cooling outlets 109, cavity 110, internal walls 112, cooling passageways 114, trailing edge section 116, cooling chamber 118, cut-back 120, pedestals 122, and flow dividers 124. Cooling passageways 114 provide cooling fluid for leading edge 102 and a mid-chord region of rotor blade 100, while cooling chamber 118 provides cooling fluid for trailing edge section 116 of rotor blade 100.

Rotor blade 100 is similar to rotor airfoil 22 described above with reference to FIG. 2A. Rotor blade 100 extends axially from leading edge 102 to trailing edge 104, with trailing edge 104 located downstream of leading edge 102. Pressure surface 106 and suction surface 108 form the major opposing surfaces or walls of rotor blade 100. Pressure surface 106 and suction surface 108 both extend axially between leading edge 102 and trailing edge 104, and radially from root section 96 to tip section 98. A column of cooling outlets 109 extend radially from root section 96 to tip section 98 at trailing edge 104 of rotor blade 100. Additional cooling outlets 109 are also possible on rotor blade (e.g. see cooling outlets 60 on airfoil 22 of FIG. 2A).

Pressure surface 106 and suction surface 108 join leading edge 102 to trailing edge 104 and define a hollow, central cavity 110 of rotor blade 100. A plurality of internal walls 112 extend transversely across cavity 110 from pressure surface 106 to suction surface 108 and connect pressure surface 106 to suction surface 108. Internal walls 112 divide cavity 110 into a plurality of cooling passageways 114 that extend through a majority of rotor blade 100. Cooling passageways 114 are spaced axially from a location near leading edge 102, through a mid-chord region, to trailing edge region 116. Cooling passages 114 can be straight or serpentine and can take a plurality of different shapes. As described with reference to FIG. 2A, cooling fluid (e.g. compressor air) flows radially through cooling passageways 114 to cool rotor blade 100.

Trailing edge region 116 has its own cooling scheme including cooling chamber 118. Cooling chamber 118 is an open area of central cavity 110 located in trailing edge region 116 of rotor blade 100. Cooling chamber 118 is bounded radially by root section 96 and tip section 98, bounded axially by cooling passageway 114 and trailing edge 104, and bounded transversely by pressure surface 106 and suction surface 108. Cut-back 120 is located at trailing edge 104 of rotor blade 100. Cut-back 120 is formed by terminating pressure surface 106 prior to terminating suction surface 108, such that suction surface 108 extends axially beyond pressure surface 106 at trailing edge 104. However, an alternate embodiment utilizing this invention is a center discharge trailing edge, where the pressure side surface 106 terminates at the same location as suction side surface 108.

Extending transversely across cooling chamber 118 is a plurality of pedestals 122. Pedestals 122 extend from attachments to internal walls of pressure surface 106 and suction surface 108. Similarly, flow dividers 124 extend transversely across cooling chamber 118 between attachments to internal walls of pressure surface 106 and suction surface 108. Flow dividers 124 extend axially across cut-back region 120. While flow dividers 124 are shown and described with reference to rotor blade 100 airfoil configuration, they are equally applicable to a stator vane airfoil configuration (e.g. stator vane 24 shown in FIG. 2B). The structure and function of flow dividers 124 is described in detail below with reference to FIG. 5.

Figure 5:
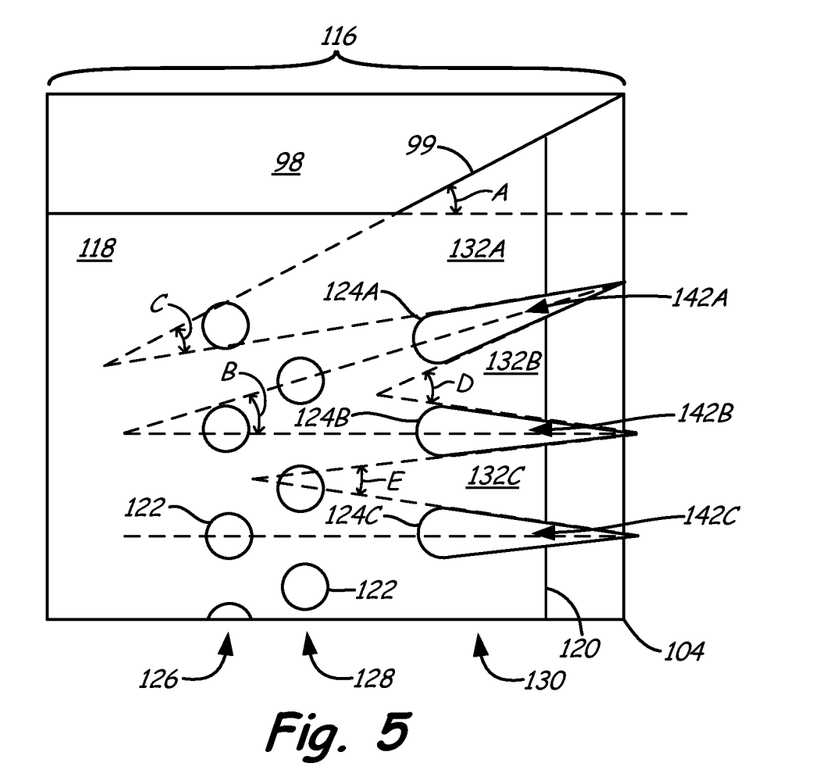
FIG. 5 is an enlarged side view of a trailing edge section of the rotor blade from FIGS. 4 & 5 with a pressure side removed.
Figure 6:
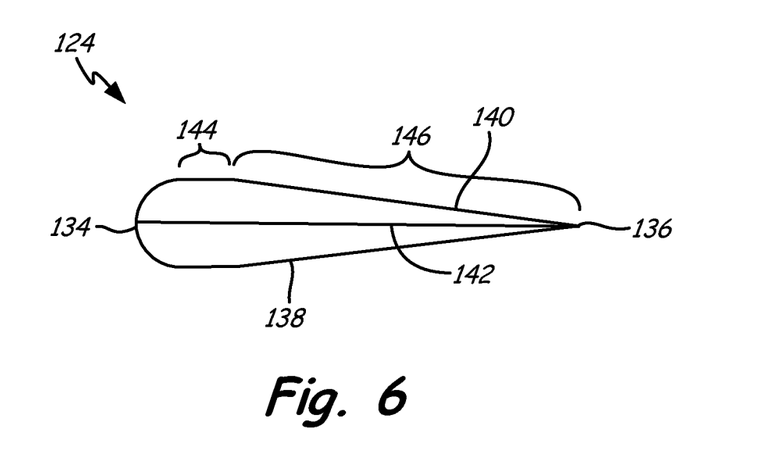
FIG. 6 is a side view of a flow separator from FIG. 5.

FIG. 5 is an enlarged side view of trailing edge section 116 of rotor blade 100 taken along box 5 of FIG. 3. Pressure side 106 is removed in FIG. 5, such that the internal features of cooling chamber 118 are visible. Rotor blade 100 includes tip 98, tip corner or flare 99, trailing edge 104, trailing edge region 116, cooling chamber 118, cut-back 120, pedestals 122, flow dividers or teardrops 124A-124C, first column 126, second column 128, third column 130, and slots or channels 132A-132C. Also shown are angles A-E. As shown in FIG. 6, each flow separator 124 (including flow separators 124A-124C) includes upstream end 134, downstream end 136, inner diameter (ID) wall 138, outer diameter (OD) wall 140, longitudinal axis 142, metering section 144 and diffusing section 146. Cooling fluid flows axially through cooling chamber 118 past pedestals 122 and flow dividers 124 to exit rotor blade 100 at trailing edge 104. The relationship between flow dividers 124 is altered to affect the diffusion angles, and therefore the behavior of cooling fluid, in trailing edge region 116 of rotor blade 100.

As described above with reference to FIGS. 3 & 4, trailing edge 104 is the most axially downstream aspect of rotor blade 100. As shown in FIG. 5, tip 98 has a flare or angled corner wall 99 that begins upstream of cutback 120 and terminates at trailing edge 104. Trailing edge 104 is the terminal portion of trailing edge section 116. Cooling chamber 118 is a generally open or hollow area defined within trailing edge region 116 that terminates with outlets at trailing edge 104. Cut-back 120 extends radially across rotor blade 100 a short distance upstream of trailing edge 104. Located within cooling chamber 118 are pedestals 122 and flow separators 124. Pedestals 122 are cylindrical in shape and have circular cross-sections while flow dividers are teardrop shaped in cross-section.

Pedestals 122 are arranged into radial columns: first column 126 and second column 128. Flow separators 124 are arranged into radial third column 130. First column 126, second column 128, and third column 130 all extend substantially parallel to one another, and serially effect cooling fluid flow passing axially through cooling chamber 118. First column 126 is the upstream-most column shown. Second column 128 is located between, and spaced a short distance from, first column 126 and third column 130. Third column 130 is the downstream-most column, is located between second column 128 and trailing edge 104, and is spaced a short distance from second column 128.

First column 126 and second column 128 are more or less identical in that they both include the pedestals 122 with uniform sizing and spacing. Pedestals 122 of second column 128 are offset from pedestals 122 of first column 126 so that a space between pedestals 122 of second column 130 is axially aligned with a pedestal 122 of first column 126 and vice versa. Third column 130 includes flow separators 124 (124A-124C) of uniform size and axially spaced by cooling channels or slots 132 (132 A-132C). Flow separators 124 of third column 130 are offset from pedestals 122 of second column 128 so that a space between pedestals 122 of second column 128 is axially aligned with a flow separator of third column 130 and vice versa.

Pedestals 122 add convective heat transfer surface area to trailing edge region 116, while partially blocking cooling fluid flow. Flow separators 124 keep cooling fluid flow separated for ejection at trailing edge 104. The cooling fluid travels axially across cooling chamber 118 through spaces or slots between pedestals 122. Cooling fluid encounters first column 126 having pedestals 122, and then second column 128 having pedestals 122. Cooling fluid snakes around upstream pedestals 122, which partially block fluid flow. Cooling fluid then encounters third column 130 having flow separators 124A-124C and passes around flow separators 124 A-124C through slots 132A-132C. From slots 132A-132C cooling fluid is ejected at outlets radially spaced along trailing edge 104 between flow separators 124A-124C.

Each flow separator 124A-124C has the structure described for flow separator 124 shown in FIG. 6. Upstream end 134 is rounded, semi-circular in cross-section, and has a diameter. Downstream end 136 is pointed, triangular in cross-section, and has an angle. The axial length of flow separator 124 can be divided into an upstream metering portion 144 having a constant thickness, and a downstream diffusion portion 146 having decreasing thickness. Inner (diameter or ID) wall 138 extends between metering section 144 and downstream end 136. Outer (diameter or OD) wall 140 extends between metering section 144 and downstream end 136. Inner wall 138 and outer wall 140 begin to converge at the location where metering portion 144 ends and diffusion portion 146 begins. Inner wall 138 and outer wall 140 converge until they meet at downstream end 136. The angle at which inner wall 138 or outer wall 140 make with teardrop centerline 142 is referred to as a taper angle. Accordingly, each inner wall 138 and each outer wall 140 has a taper angle. For two adjacent flow separators 124 (e.g. 124B and 124C), inner wall 138 of one flow separator (e.g. 124B) faces outer wall 140 of the next flow separator (124C). The taper angle for inner wall 138 can be summed with the taper angle of the adjacent outer wall 140 to calculate a diffusion angle for a slot (e.g. 132C) located between the two adjacent flow separators (124B and 124C).

Tip corner 99 forms taper angle A with a line drawn parallel to a center line of an engine (e.g. CL in FIG. 1) and rotational axis of rotor blade 100. Taper angle A is between about 15-25 degrees. In the depicted embodiment, taper angle A is about 20 degrees.

First flow separator 124A is angled toward tip 98 and is not parallel with flow separators 124B and 124C. More specifically, first flow separator 124A is skewed by offset angle B, where angle B is measured between centerline 142A of teardrop 124A and centerline 142B of teardrop 124B. Offset angle B is between about 1-15 degrees. In the depicted embodiment, offset angle B is 6 degrees. First cooling slot 132A is bounded by tip corner 99 and an outer wall (i.e. 140) of first flow separator 124A. First cooling slot 132A has a diffusion angle C of less than 20 degrees. In the depicted embodiment, first cooling slot 132A has a diffusion angle of 18 degrees.

Second cooling slot 132B is bounded by inner wall (i.e. 138) of first flow separator 124A and outer wall (i.e. 140) of second flow separator 124B. Inner wall (i.e. 138) of first flow separator 124A and outer wall (i.e. 140) of second flow separator 124B form diffusion angle D. Second cooling slot 132B has a diffusion angle D between about 1-15 degrees. In the depicted embodiment, second cooling slot 132B has a diffusion angle of 14 degrees.

Third cooling slot 132C is bounded by inner wall (i.e. 138) of second flow separator 124B and outer wall (i.e. 140) of third flow separator 124C. Inner wall (i.e. 138) of second flow separator 124B and outer wall (i.e. 140) of third flow separator 124C form diffusion angle E. Third cooling slot 132C has a diffusion angle E between about 2-10 degrees. In the depicted embodiment, third cooling slot 132C has a diffusion angle of 8 degrees.

The diffusion angle of first cooling slot 132A (angle C) is greater than the diffusion angle of second cooling slot 132B (angle D). The diffusion angle of second cooling slot 132B (angle D) is greater than the diffusion angle of third cooling slot 132C (angle E).

Second flow separator 124B and third flow separator 124C are parallel to one another. In other words, longitudinal axis (i.e. 142) of second flow separator 124B is parallel to a longitudinal axis (i.e. 142) of third flow separator 124C, both of which are parallel to the center line of an engine (i.e. CL in FIG. 1) and rotational axis of rotor blade 100. First flow separator 124A is not parallel to any of second flow separator 124B, third flow separator 124C, or the center line of an engine (i.e. CL in FIG. 1) and rotational axis of rotor blade 100. Rather, first flow separator 124A is offset from this parallel orientation.

Blades, vanes, and other turbine components are exposed to high temperatures. For example, blade tips commonly experience tip oxidation or burn-through, particularly towards the trailing edge tip. When flow separators are all arranged parallel to one another at the trailing edge and a large tip taper angle A exists, a separated region of cooling flow can be observed. This separation can form at an inner diameter side of cooling slots and reduces cooling effectiveness while increasing metal temperatures. In FIG. 5, first flow separator 124A is skewed from parallel so that cooling fluid forms better attachment at tip corner 99 resulting in improved heat transfer. Skewing first flow separator 124A counter-clockwise helps reduce flow separation, enables slots to properly fill with minimal flow separation, and produces a more uniform flow stream coming out of the slot. Ultimately, blade life would improve thereby reducing program life cycle costs in the long term while helping in performance retention as tip wear is minimized.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

An airfoil includes a leading edge, a trailing edge region, a suction surface, a pressure surface, a cooling passageway, and a column of flow separators. The trailing edge region is located axially downstream from the leading edge and terminates in a trailing edge. The suction surface and the pressure surface both extend axially between the leading edge and the trailing edge region, as well as radially from a root section of the airfoil to a tip section of the airfoil to define a central cavity of the airfoil. The cooling passageway is located within the central cavity at the trailing edge region. The column of flow separators are located in the cooling passageway adjacent the trailing edge. The column of flow separators includes a first flow separator having a first longitudinal axis and a second flow separator having a second longitudinal axis. The first longitudinal axis is offset at an angle with respect to the first longitudinal axis.

The airfoil of the preceding paragraph can optionally include, additionally and/or alternatively any, one or more of the following features, configurations and/or additional components:

The first longitudinal axis can be offset about 1-15 degrees;

the first longitudinal axis can be offset 6 degrees from parallel with the second longitudinal axis;

the first flow separator can be adjacent the tip section of the airfoil;

a first cooling slot can be located between the first flow separator and the tip section, wherein the first cooling slot has a diffusion angle less than 20 degrees;

a second cooling slot can be located between the second flow separator and the first flow separator, wherein the second cooling slot has a diffusion angle less than 15 degrees;

the airfoil can be a blade; and/or the airfoil can be a vane.

An airfoil for a gas turbine engine includes an airfoil, an internal chamber, and a column of teardrop features. The airfoil includes a convex surface and a concave surface. Both the convex surface and the concave surface extend radially from a root section to a tip section and axially from a leading edge to a trailing edge section. The trailing edge section terminates in a trailing edge having a cut-back on the concave surface. The internal chamber is defined between the convex surface and the concave surface and includes an axially extending cooling air passageway. The cooling air passageway has a plurality of radially spaced cooling air slots terminating in outlets at the trailing edge. The column of teardrop features is located in the cooling air passageway and includes a first teardrop, a second teardrop, and a third teardrop. The first teardrop is spaced from the tip section by a first cooling air slot. The second teardrop is spaced from the first teardrop by a second cooling air slot. The third teardrop spaced from the second teardrop by a third cooling air slot. The third teardrop and the second teardrop extend parallel to one another, and the first teardrop is oriented at an angle relative to the second teardrop.

The airfoil of the preceding paragraph can optionally include, additionally and/or alternatively any, one or more of the following features, configurations and/or additional components:

A first diffusion angle of the first slot can be greater than a second diffusion angle of the second slot;

the second diffusion angle of the second slot can be greater than a third diffusion angle of the third slot;

at least one column of cylindrical pedestals can be located within the cooling passageway upstream of the column of teardrop features;

the airfoil can be a blade; and/or the airfoil can be a vane.

An airfoil for a gas turbine engine including a leading edge, a trailing edge, a pressure surface, a suction surface, a cooling passageway, a first flow separator, and a second flow separator. The leading edge and the trailing edge both extend from a root section to a tip section. The pressure surface and the suction surface both extend between the leading edge and the trailing edge, as well as between the root section and the tip section. The pressure surface and the suction surface define a hollow center. The cooling passageway extends through the hollow center and includes cooling slots terminating with outlets at the trailing edge. The first flow separator is located within the cooling passageway adjacent the trailing edge and spaced from the tip section by a first cooling slot. The first flow separator includes a first rounded upstream end, a first outer wall, and a first inner wall. The first outer wall and first inner wall converge at a first downstream end, and a first longitudinal axis extends through the first flow separator from the first rounded upstream end to the first downstream end. The second flow separator is spaced from the first flow separator by a second cooling slot. The second flow separator includes a second rounded upstream end, a second outer wall, and a second inner wall. The second outer wall and second inner wall converge at a second downstream end, and a second longitudinal axis extends through the second flow separator from the second rounded upstream end to the second downstream end. The first longitudinal axis is angled with respect to the second longitudinal axis.

The airfoil of the preceding paragraph can optionally include, additionally and/or alternatively any, one or more of the following features, configurations and/or additional components:

the first longitudinal axis can be angled counter-clockwise toward the tip section;

a third flow separator can be spaced from the second flow separator by a third cooling slot, the third flow separator including a third rounded upstream end, a third outer wall, and a third inner wall, the third outer wall and third inner wall converging at a third downstream end, a third longitudinal axis extending through the third flow separator from the third rounded upstream end to the third downstream end, wherein the third longitudinal axis is parallel to the second longitudinal axis;

the airfoil can be a blade; and/or the airfoil is a vane.

The invention claimed is:

1. An airfoil comprising:
   a leading edge and a trailing edge region, the trailing edge region located axially downstream from the leading edge and terminating in a trailing edge;
   a suction surface and a pressure surface, the suction surface and the pressure surface both extending axially between the leading edge and the trailing edge region, as well as radially from a root section of the airfoil to a tip section of the airfoil to define a central cavity of the airfoil;
   a cooling passageway located within the central cavity at the trailing edge region; and
   a column of flow separators located in the cooling passageway adjacent the trailing edge, the column of flow separators comprising:
   a first flow separator having a first longitudinal axis;
   a second flow separator having a second longitudinal axis, wherein the first longitudinal axis is offset at an angle between 1 and 15 degrees with respect to the second longitudinal axis;
   a third flow separator having a third longitudinal axis, wherein the second longitudinal axis and the third longitudinal axis are substantially parallel to one another;
   a first cooling slot located between the first flow separator and the tip section, wherein the first cooling slot has a diffusion angle less than 20 degrees;
   a second cooling slot located between the second flow separator and the first flow separator, wherein the second cooling slot has a diffusion angle less than 15 degrees; and
   a third cooling slot located between the third flow separator and the second flow separator, wherein the third cooling slot has a diffusion angle less than or equal to 10 degrees.

2. The airfoil of claim 1, wherein the first longitudinal axis is offset at an angle of 6 degrees with respect to the second longitudinal axis.

3. The airfoil of claim 1, wherein the airfoil is a blade.

4. The airfoil of claim 1, wherein the airfoil is a vane.

5. An airfoil for a gas turbine engine, the component comprising:
   an airfoil including a convex surface and a concave surface, both the convex surface and the concave surface extending radially from a root section to a tip section and axially from a leading edge to a trailing edge section, the trailing edge section terminating in a trailing edge having a cut-back on the concave surface;
   an internal chamber defined between the convex surface and the concave surface, the internal chamber including an axially extending cooling air passageway, the cooling air passageway having a plurality of radially spaced cooling air slots terminating in outlets at the trailing edge;
   a column of teardrop features located in the cooling air passageway, the column of teardrop features including:
   a first teardrop spaced from the tip section by a first cooling air slot, the first cooling air slot having a first diffusion angle;
   a second teardrop spaced radially from the first teardrop by a second cooling air slot, the second cooling air slot having a second diffusion angle smaller than the first diffusion angle;
   a third teardrop spaced radially from the second teardrop by a third cooling air slot, the third cooling air slot having a third diffusion angle smaller than the second diffusion angle, wherein the third teardrop and the second teardrop extend parallel to one another and the first teardrop is oriented at an angle relative to the second teardrop; and
   a radial column of generally cylindrical pedestals extending through the cooling air passageway from the convex surface to the concave surface and located upstream of the column of teardrop features.

6. The airfoil of claim 5, wherein the airfoil is a blade.

7. The airfoil of claim 5, wherein the airfoil is a vane.

8. An airfoil for a gas turbine engine, the airfoil comprising:
   a leading edge and a trailing edge, the leading edge and the trailing edge both extending from a root section to a tip section;
   a pressure surface and a suction surface, the pressure surface and the suction surface both extending between the leading edge and the trailing edge, as well as between the root section and the tip section, the pressure surface and the suction surface defining a hollow center;

a cooling passageway extending through the hollow center, the cooling passageway including cooling slots terminating with outlets at the trailing edge;

a first flow separator located within the cooling passageway adjacent the trailing edge and spaced from the tip section by a first cooling slot, the first flow separator including a first rounded upstream end, a first outer wall, and a first inner wall, the first outer wall and first inner wall converging at a first downstream end, a first longitudinal axis extending through the first flow separator from the first rounded upstream end to the first downstream end, wherein the first longitudinal axis is angled so that the first downstream end is closer to the tip section than the first rounded upstream end;

a second flow separator spaced radially from the first flow separator by a second cooling slot, the second flow separator including a second rounded upstream end, a second outer wall, and a second inner wall, the second outer wall and second inner wall converging at a second downstream end, a second longitudinal axis extending through the second flow separator from the second rounded upstream end to the second downstream end, wherein the first longitudinal axis is angled with respect to the second longitudinal axis; and a third flow separator spaced radially from the second flow separator by a third cooling slot, the third flow separator including a third rounded upstream end, a third outer wall, and a third inner wall, the third outer wall and third inner wall converging at a third downstream end, a third longitudinal axis extending through the third flow separator from the third rounded upstream end to the third downstream end, wherein the third longitudinal axis is substantially parallel to the second longitudinal axis.

9. The airfoil of claim 8, wherein the airfoil is a blade.

10. The airfoil of claim 8, wherein the airfoil is a vane.

\* \* \* \* \*